Figure 1:
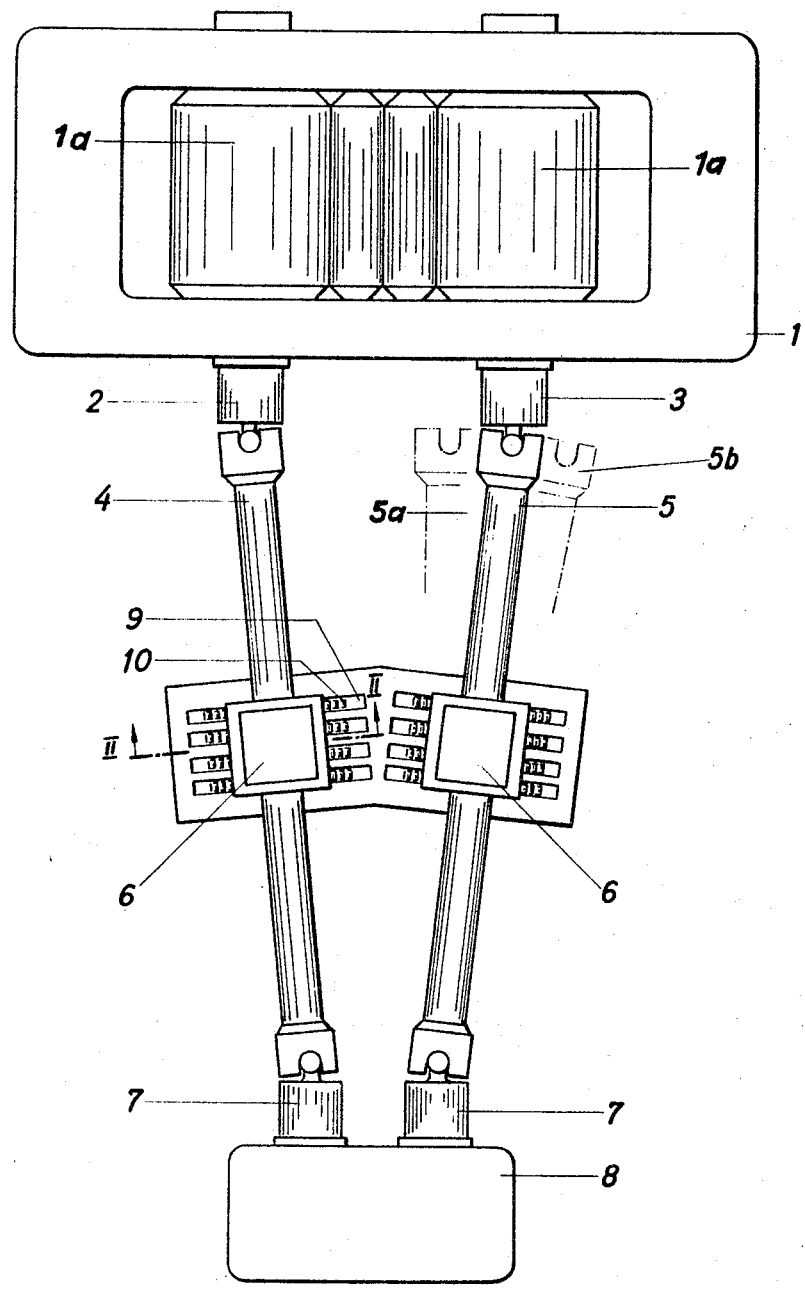

United States Patent Office 3,320,789
Patented May 23, 1967

3,320,789
SUPPORT MEANS FOR THE DRIVE SHAFTS OF HORIZONTAL ROLL STANDS
Werner Marx, Dusseldorf, Germany, assignor to Schloemann Aktiengesellschaft, Dusseldorf, Germany
Filed Sept. 22, 1964, Ser. No. 398,336
Claims priority, application Germany, Oct. 17, 1963, Sch 34,005
8 Claims. (Cl. 72—249)

This invention relates to the construction of supports for the drive shafts of horizontal roll stands in which the rolls are mounted in a horizontal plane side by side.

In such roll stands which are used for instance for rolling metal powders into coherent strip or sheet material, the construction of the supports for the drive shafts which must be disposed in the same horizontal plane as the necks of the rolls presents considerable difficulties. These difficulties arise because adjustment of the clearance between the rolls necessitates simultaneously shifting the drive shafts in order to avoid subjecting the latter to bending moments. If means are provided for horizontally moving the supports of the shafts, these must comprise complicated mechanism for precisely synchonising the shift of the supports of the shafts with the movement of the rolls during adjustment in order to prevent such bending moments from being created.

It is the object of the present invention to avoid the need of special mechanism for shifting the shaft supports and to provide an arrangement which, during adjustment of the rolls, will nevertheless reduce the bending moments to which the shafts are subjected and the reactive moments acting on the roll neck couplings to the minimum possible extent. According to the invention this is achieved by supporting the drive shaft bearings from a baseplate movably mounted on rolling elements in such a way that the shafts can yield to the deflecting moments which arise when the rolls are adjusted. By using rolling elements as support means for the shaft bearings, friction as well as the effort needed for effecting adjustments are reduced to a minimum, eliminating the need for mechanism for horizontally shifting the drive shafts by transmitting the effort for shifting the supports exclusively through the shafts themselves. Conveniently, the bearings of the shaft supports are yieldingly and elevationally adjustably supported from the baseplates to compensate any unavoidable slight imprecision in the running accuracy of the shafts and the baseplate. Axially of the shafts the bearings are preferably fixed. The provision of special guide means for guiding the baseplate during during adjustment can thus be dispensed with. The face of the baseplate resting on the rolling elements may therefore be a plain flat surface. The rolling elements may have the form of needle rollers or balls. If needle roller are used, these should be contained in a horizontal cage and they may run in guide grooves in a special bed sunk into the foundations. If balls are used it is preferred to provide V-slots in the bed for guiding the balls. Finally, the rolling elements may simply be ball heads in the bearing face of the baseplate. In such a case the bed need not be provided with special guiding grooves or the like.

Figure 2:
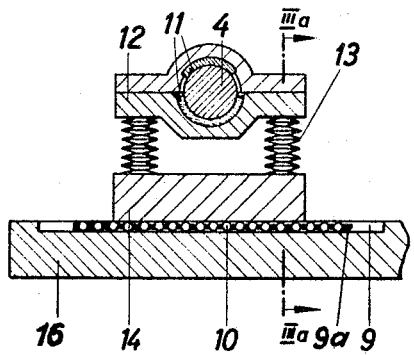

Embodiments of the invention will now be illustratively described by reference to the accompanying drawings in which FIG. 1 is a plan view of a horizontal roll stand, pinion housing, shaft transmission and shaft supports, FIG. 2 is a section taken on the line II—II through one of the supports in FIG. 1, and FIGS 3a, 3b and 3c are alternative embodiments of rolling support means for the shaft supports, drawn to a larger scale.

Figure 3A:
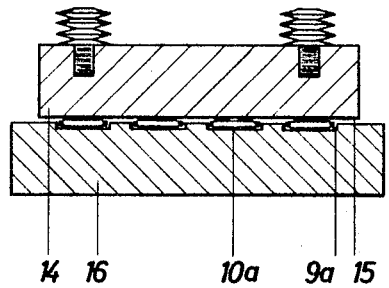
Figure 3B:
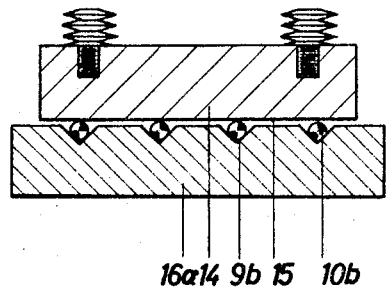
Figure 3C:
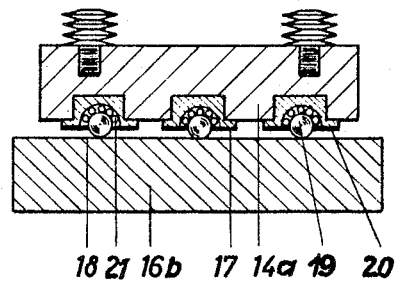

In FIG. 1 the horizontal roll stand is shown at 1, 2 and 3 being the couplings on the necks of the rolls 1a; 4 and 5 are the drive shafts, 6 are the two shaft supports and 7 are the couplings on the shaft ends of the cylinder pinions in a housing 8. When the rolls are adjusted, that is to say when they are horizontally moved in the roll stand 1, the ends of the two drive shafts 4 and 5 are forced to participate in this movement and the mountings at 6 must correspondingly shift horizontally. For example, the end of drive shaft 5 may thus be moved into one of the two positions 5a or 5b shown in discontinuous outlines. In order to reduce the effort needed for the horizontal displacement of the shaft support 6 to a minimum, the baseplates 14 of the supports rests on rolling elements 10 running in guide grooves 9. The mounting 12 containing the brasses 11 for shaft 4 is resiliently and elevationally adjustably supported from baseplate 14 on dish springs 13 to permit the reactive load-supporting thrust of the support as well as elevational alignment of the brasses 11 of the drive shaft bearing with the couplings 2, 3 and 7 on the roll necks and pinion shafts to be precisely adjusted. The bearing mounts 12 are axially fixed in relation to the drive shafts 4 and 5. In FIG. 3a the bearing face 15 of the baseplate 14 is completely flat and rests on four sets of needle rollers 10a, each set of needle rollers running in a cage 9a in a groove provided in a bed 16. In FIG. 3b the rolling elements 10b are balls running in V-slots 9b in a bed 16a. When the shaft mountings 6 are shifted the bearing face 15 of the baseplate 14 runs on these rolling elements 10a or 10b. In FIG. 3c ball heads 17 are inserted into the bearing face of baseplate 14a. Each ball 19 is held in a cage 20 and upwardly bears on a plurality of small balls 21. The bed 16b has a completely plain flat face upon which the balls 19 can run. Naturally, cages of neighbouring balls may be integrally combined.

What I claim is:

1. Means for supporting the drive shafts of rolling-mill rolls mounted side by side in a horizontal plane in a horizontal roll stand, comprising: a stationary bed fixed in the roll stand for each drive shaft, a base-plate horizontally movable upon the said bed, and rolling bearing elements interposed between the bed and the base-plate, so arranged as to permit horizontal movement of the base-plate in the direction of roll adjustment, the effort required for moving the base-plate being transmitted thereto exclusively by the drive shaft itself.

2. Means for supporting the drive shafts of rolling-mill rolls as claimed in claim 1, further comprising resilient means for supporting the drive shaft adjustably from the said base-plate.

3. Means for supporting the drive shafts of rolling-mill rolls as claimed in claim 1, further comprising a bearing mount the axial position of which is fixed relatively to the drive shaft.

4. Means for supporting the drive shafts of rolling-mill rolls as claimed in claim 1, the bearing face of the base-plate being flat, and the bed being formed with grooves constituting a cage, and the base-plate resting movably upon the rolling elements, which are accommodated in the said cage.

5. Means for supporting the drive shafts of rolling-mill rolls as claimed in claim 1, the bearing face of the base-plate being flat, the rolling elements being needle rollers, and the bed being formed with grooves constituting a cage for the said needle rollers.

6. Means for supporting the drive shafts of rolling-mill rolls as claimed in claim 1, the bearing face of the base-plate being flat, the bed being formed with V grooves, and the rolling elements being bearing balls running in the said grooves.

7. Means for supporting the drive shafts of rolling-mill rolls as claimed in claim 1, the bearing face of the bed being flat, and the supporting means further comprising ball cages secured to the under side of the base-plate, and the rolling bearing elements being bearing balls engaged in the said ball cages.

8. Means for supporting the drive shafts of rolling-mill rolls as claimed in claim 7, further comprising small anti-friction balls interposed between the said bearing balls and the ball cages.

References Cited by the Examiner

UNITED STATES PATENTS

| Re. 14,053 | 1/1916 | Lamberton | 72—249 |
| 685,981 | 11/1801 | Guss | 72—233 |
| 1,261,548 | 4/1918 | Kennedy | 72—233 |
| 2,150,248 | 3/1939 | Rosenbaum | 72—249 |

OTHER REFERENCES

VDI-Zeitschrift Jahrgang 100, Nr. 21, July 21, 1958, p. 921.

CHARLES W. LANHAM, *Primary Examiner.*

L. A. LARSON, *Assistant Examiner.*